United States Patent [19]

Bryant

[11] Patent Number: 5,030,985

[45] Date of Patent: Jul. 9, 1991

[54] EXPOSURE BALANCE ARRANGEMENT FOR AN IMAGE FIXING DEVICE

[75] Inventor: Robert S. Bryant, Rochester, N.Y.

[73] Assignee: Eastman Kodak Company, Rochester, N.Y.

[21] Appl. No.: 568,799

[22] Filed: Aug. 17, 1990

[51] Int. Cl.⁵ .......................... G03B 7/28; G03B 11/00
[52] U.S. Cl. .................................... 354/432; 354/456; 354/227.1; 358/225
[58] Field of Search ...................... 354/432, 456, 227.1; 358/225

[56] References Cited

U.S. PATENT DOCUMENTS

| | | | |
|---|---|---|---|
| 3,724,349 | 4/1973 | von Belvard et al. | 95/44 R |
| 3,986,022 | 10/1976 | Hyatt | 250/205 |
| 4,050,814 | 9/1977 | McFadden | 355/71 |
| 4,473,288 | 9/1984 | Anodera et al. | 354/432 |
| 4,526,454 | 7/1985 | Suzuki et al. | 354/227.1 |
| 4,589,030 | 5/1986 | Kley | 358/225 |
| 4,603,356 | 7/1986 | Bates | 358/225 |
| 4,833,540 | 5/1989 | Kokubu | 358/225 |

Primary Examiner—Michael L. Gellner
Attorney, Agent, or Firm—Edward Dugas

[57] ABSTRACT

An exposure balance arrangement for a film or electronic camera employs a matrix metering full frame CCD which looks at an image and bit maps pixel locations of high light intensity. This information is used to selectively darken areas on an X-Y addressable electronic shutter through which the image passes.

10 Claims, 1 Drawing Sheet

EXPOSURE BALANCE ARRANGEMENT FOR AN IMAGE FIXING DEVICE

BACKGROUND OF THE INVENTION

1. Field of the Invention

The present invention generally relates to an exposure balance arrangement for an image fixing device and more particularly to an exposure balance arrangement for selectively eliminating areas of an image having unacceptably high light intensity.

2. Discussion of the Background

Photographic and electronic cameras essentially comprise a light-tight enclosure for enclosing a light sensitive material, a lens or other means for forming an image and an arrangement for controlling the time during which light is permitted to reach the light sensitive material, i.e., a shutter. Oftentimes the camera will further include other elements such as the diaphragm for controlling the amount of light emitted by the lens.

One particular problem with employing a shutter or diaphragm to control the exposure of the light sensitive material is that there may be selective areas within the image formed on the photosensitive material which have a light intensity which is larger than desired. In order to compensate for these areas of high light intensity, at least one of the opening size of the diaphragm or opening time of the shutter is reduced. However, this approach can result in an inappropriate exposure of the overall image such that areas which have light intensities below the selective areas of high light intensity are not exposed sufficiently causing dark prints or the like.

Programmable light control matrix devices have been disclosed, such as by U.S. Pat. No. 4,050,814, wherein individually electrically energizable cells, containing electrooptic material, control a light pattern which is transmitted therethrough to form a changeable photographic mask. However, this arrangement makes no provision for utilizing a matrix of light detectors to sense areas of high light intensity to control the darkening of selective ones of individual cells of the light control matrix device to provide exposure balance.

Additionally, a solid state camera has been disclosed in U.S. Pat. No. 4,589,030 in which an electrooptic mask is employed to selectively activate or deactivate regions thereof to pass or block passage of light in image regions through the mask to a detector array such as a charged couple device array. However, this camera makes no provision for employing the electrooptic mask to prevent passage of light having a light intensity greater than a predetermined level to provide exposure balance.

In the image processing apparatus disclosed by U.S. Pat. No. 4,833,540, a shutter is provided with a number shutter elements which correspond to light reception elements of a light reception surface. A scanning arrangement is arranged to generate a scanning signal at predetermined timing so as to successively cause the shutter elements to open in response to the scanning signal. However, this image processing apparatus makes no provision for employing the shutter elements to selectively block areas of an image having high light intensity to provide exposure balance.

The solid state diaphragm device disclosed by U.S. Pat. No. 4,526,450 is employed in an electronic camera. However, this diaphragm makes no provision for selectively darkening areas of high light intensity to provide exposure balance.

SUMMARY OF THE INVENTION

Therefore, it is an object of the present invention to provide an exposure balance arrangement for selectively darkening areas of an image having a light intensity greater than a predetermined level.

These and other objects, advantages and features of the present invention are provided by an exposure balance arrangement which, according to one embodiment of the present invention, comprises a matrix of light detectors arranged in a plurality of pixel locations for receiving a light image and for sensing pixel locations having a light intensity greater than a predetermined level. An arrangement for bit mapping pixel locations having high light intensities is provided and connected to an X-Y addressable shutter having a plurality of individual addressable light valve cells such that selective ones of the individual cells of the addressable shutter are darkened which correspond to pixel locations sensed as having a light intensity greater than the predetermined level to provide exposure balance.

According to a further embodiment of the present invention, the matrix of light detectors comprises a matrix metering full frame charge coupled device and the X-Y addressable shutter comprises an electronic shutter.

One particular advantage of the present invention is its application both to photographic and electronic cameras.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
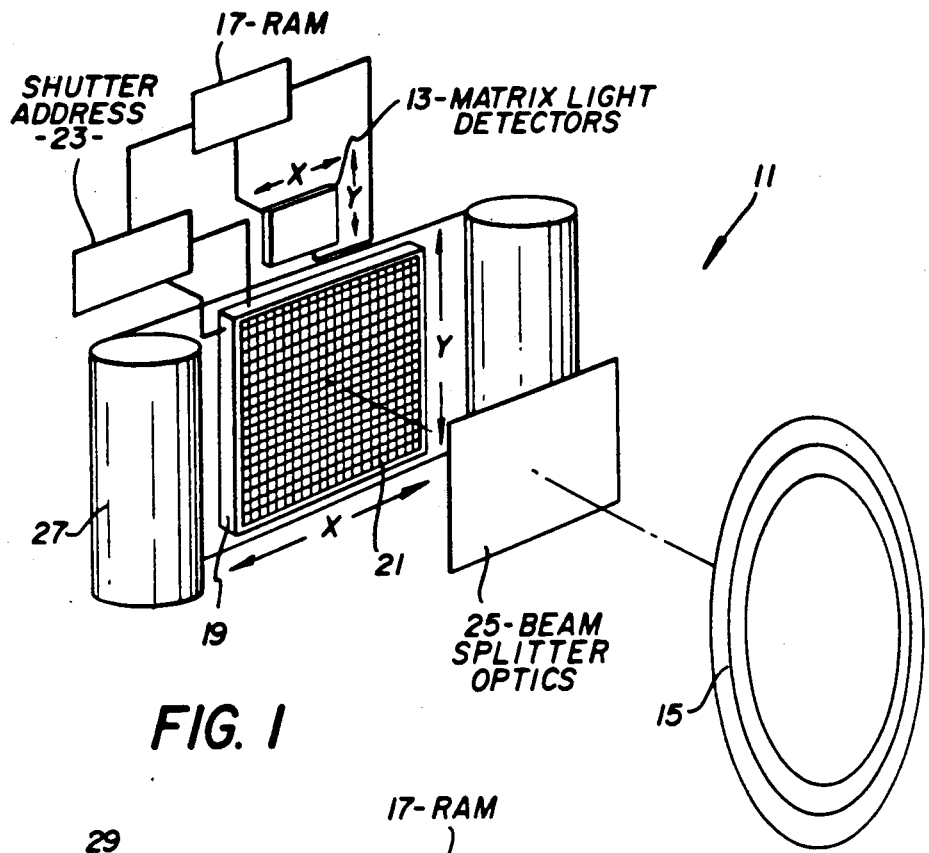
FIG. 1 illustrates one embodiment of the present invention for application to a photographic camera.

Various other objects, features and attendant advantages of the present invention will be more fully appreciated as the same becomes better understood from the following detailed description when considered in connection with the accompanying drawings in which like reference characters designate like or corresponding parts throughout the several views.

Referring to FIG. 1, one embodiment of the exposure balance arrangement of the present invention is illustrated generally at 11 for use with a photographic camera. The exposure balance arrangement includes a matrix of light detectors 13 arranged as a plurality of pixel locations for receiving a light image formed by a lens 15, the matrix of lights detectors 13 sensing pixel locations having a light intensity at least as large as a predetermined level. Preferably, the matrix of light detectors 13 form an array of columns which extend in the Y direction which are orthogonal to a plurality of rows which extend in the X direction.

The array of light detectors 13 is connected to an arrangement 17 for bit mapping pixel locations sensed by the matrix of light detectors 13 having high light intensities at least as large as the predetermined level. One suitable device for bit mapping the pixel locations is, for example, a random access memory (RAM). The bit mapping arrangement 17 is connected to an addressable X-Y shutter 19 having a plurality of individual addressable light valve cells 21 corresponding to the plurality of pixel locations of the matrix of light detectors 13. The X-Y addressable shutter 19 is connected to the bit mapping arrangement 17 via a shutter address 23 for addressing and darkening selective ones of the individual cells 21 of the X-Y addressable shutter 19 corresponding to pixel locations of the matrix of light detectors 13 which have been sensed as having a light intensity at least as large as the predetermined level.

Additionally, beam splitter optics 25 are included for providing the image formed by the lens 15 both to the matrix of light detectors 13 as well as to photographic film 27 for fixing the image passed by the X-Y addressable shutter 19.

Figure 2:
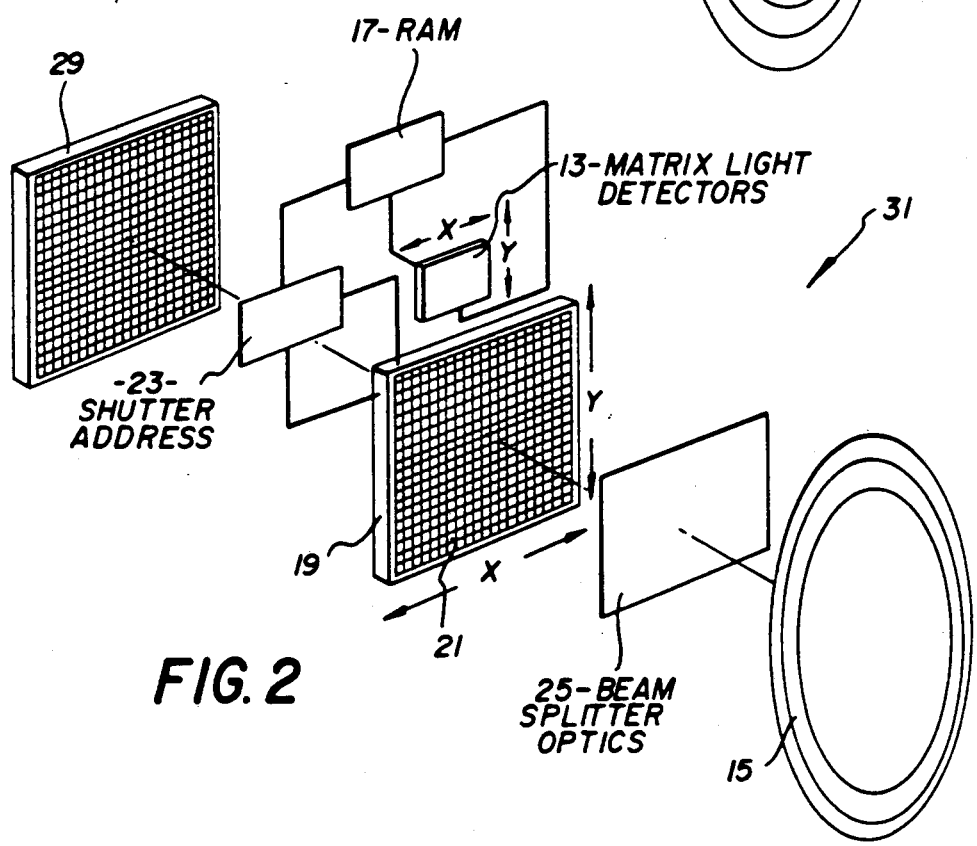
FIG. 2 illustrates a further embodiment of the present invention for application to an electronic camera.

Referring to FIG. 2, a further embodiment of the exposure balance arrangement of the present invention is generally indicated at 31 for application to an electronic camera. The exposure balance arrangement 31 of FIG. 2 is essentially similar to the arrangement of FIG. 1; however, instead of employing photographic film 27, this embodiment employs an image capture CCD 29 for fixing the image formed by the lens 15 and passed by the X-Y addressable shutter 19.

In the embodiments of the present invention illustrated in FIGS. 1 and 2, the matrix of light detectors can comprise, for example, a matrix metering full frame charge coupled device and the X-Y addressable shutter can comprise, for example, an electronic shutter. Further, each one of the individual cells of the X-Y addressable shutter 13 can, according to preferred embodiments of the present invention, correspond to one of the pixel locations of the light detectors of the matrix 13 on a one-to-one basis.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An exposure balance arrangement for an image fixing device comprising:
   a matrix of light detectors arranged as a plurality of pixel locations for receiving a light image and for sensing pixel locations having a light intensity at least as large as a predetermined level;
   means for bit mapping pixel locations, sensed by the matrix of light detectors, having high light intensities at least as large as the predetermined level;
   an X-Y addressable shutter having a plurality of individual addressable light valve cells corresponding to the plurality of pixel locations of the matrix of light detectors; and
   means for addressing and darkening selective ones of the individual cells of the X-Y addressable shutter corresponding to pixel locations of the matrix of light detectors sensed as having a light intensity at least as large as the predetermined level.

2. An arrangement according to claim 1, wherein the matrix of light detectors comprises a matrix metering full frame charge coupled device.

3. An arrangement according to claim 1, wherein each individual cell of the X-Y addressable shutter corresponds to one of the pixel locations of the light detectors of the matrix.

4. An arrangement according to claim 1 further comprising means for focusing the light image on both the matrix of light detectors and an image fixing means for fixing the image passed by the X-Y addressable shutter.

5. An arrangement according to claim 4, wherein the image fixing means is photographic film.

6. An arrangement according to claim 5, wherein the image fixing means is an image capturing charge coupled device.

7. An arrangement according to claim 1, wherein the X-Y addressable shutter is an electronic shutter.

8. An arrangement according to claim 1, wherein the image fixing device is a photographic camera.

9. An arrangement according to claim 1, wherein the image fixing device is an electronic camera.

10. An exposure balance arrangement for an image fixing device comprising:
    a matrix metering full frame charge coupled device, having a plurality of pixel locations, for receiving an image and sensing pixel locations of high light intensity;
    means for bit mapping pixel locations of high light intensity sensed by the matrix meter full frame charge coupled device;
    an X-Y addressable electronic shutter having a plurality of individual addressable light valve cells, and
    means for selectively darkening selective ones of the individual cells of the electronic shutter corresponding to pixel location of the matrix metering full frame charge coupled device sensed as having high light intensity.

* * * * *